United States Patent [19]
Barker

[11] Patent Number: 5,538,255
[45] Date of Patent: Jul. 23, 1996

[54] REMOTE CONTROLLED MULTIPLAYER VIDEO GAME

[76] Inventor: Bruce J. Barker, 125 Fifth Ave., Apt. 12D, Pelham, N.Y. 10803

[21] Appl. No.: 837,057

[22] Filed: Feb. 18, 1992

[51] Int. Cl.⁶ ................................................. G06F 17/00
[52] U.S. Cl. ............................................ 463/41; 463/47
[58] Field of Search ................................ 273/433, 434, 273/438, 439, DIG. 28, 85 G, 237, 148 B; 364/410; 379/90, 93, 96, 97

[56] References Cited

U.S. PATENT DOCUMENTS

| | | | |
|---|---|---|---|
| 3,860,952 | 1/1975 | Tallent et al. | 358/8 |
| 3,900,885 | 8/1975 | Tallent et al. | 358/8 |
| 3,993,982 | 11/1976 | Tallent et al. | 340/173 R |
| 4,018,990 | 4/1977 | Long et al. | 358/149 |
| 4,372,558 | 2/1983 | Shimamoto et al. | 273/237 |
| 4,507,930 | 2/1986 | Matheson | 273/439 |
| 4,572,509 | 2/1986 | Sitrick | 273/85 |
| 4,958,835 | 9/1990 | Tashiro et al. | 273/85 G |
| 5,273,288 | 12/1993 | Teshima et al. | 273/237 |
| 5,292,125 | 5/1994 | Hochstein et al. | 273/148 B |

FOREIGN PATENT DOCUMENTS

| | | | |
|---|---|---|---|
| 2147817 | 5/1985 | United Kingdom | 273/237 |

*Primary Examiner*—Jessica J. Harrison

[57] ABSTRACT

A video game controller for allowing a local player to play a video game against a remote player who is located, for example, in a different home than the local player. The controller receives a plurality of image control commands from a local input device operated by the local player. The controller includes a modem which transmits the local image control commands to a remote game controller connected to a transmission line. The modem also receives from the remote game controller a plurality of remote image control commands. The video game controller then generates a sequence of game image frames in response to the local and remote image control commands. The video controller generates the sequence of local image frames in synchronism with an identical sequence of remote image frames. The video controller determines a current status F of the sequence of local image frames. It receives a local image control command $S_L(F)$ representative of a user's instruction for changing the current status F of the image frame sequence. It then transmits the local control command $S_L(F)$ to a remote controller. The video controller receives from the remote video controller a remote image control command $S_r(F)$. It then generates in response to the local and remote image control commands, a new image frame.

14 Claims, 10 Drawing Sheets

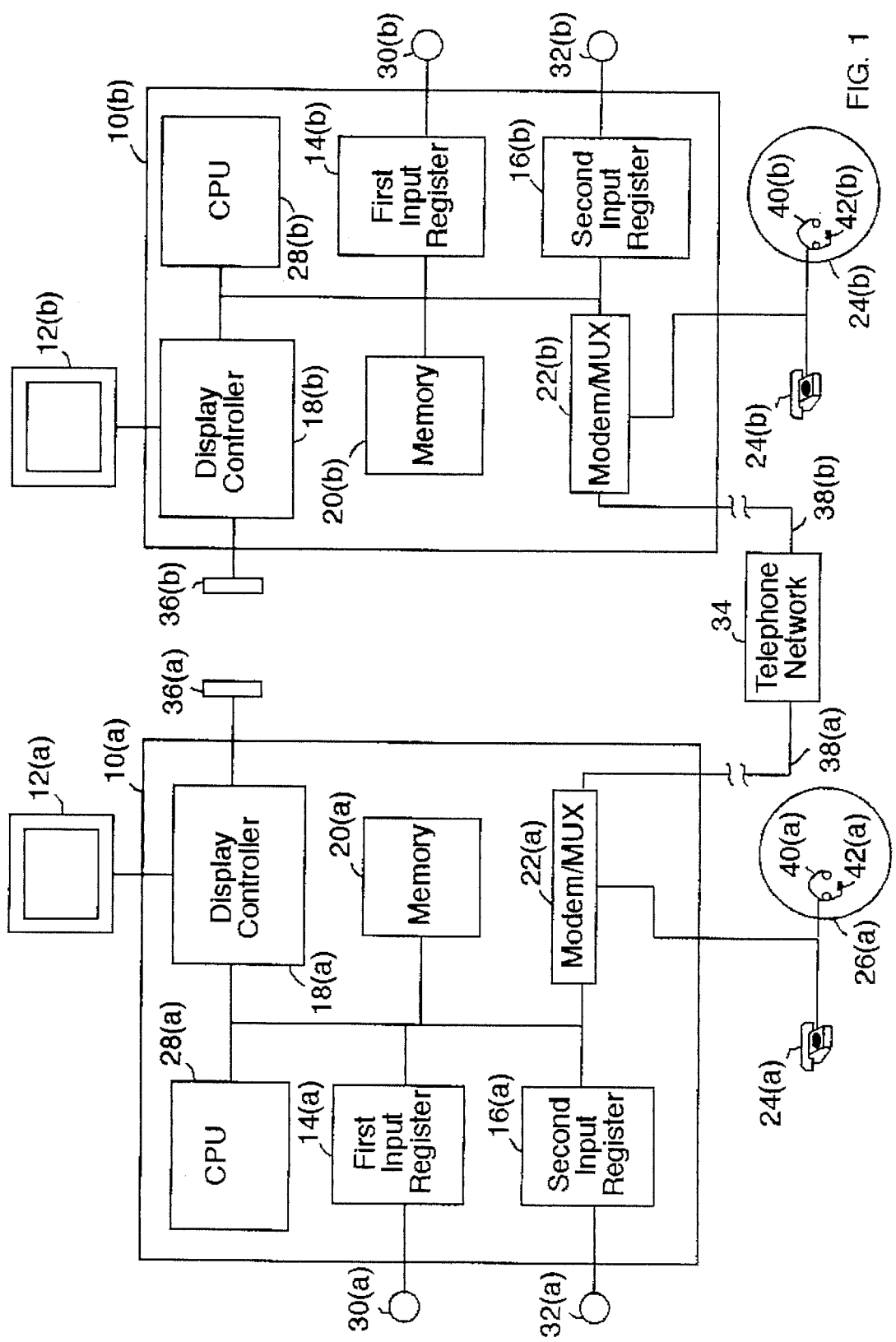

REMOTE CONTROLLED MULTIPLAYER VIDEO GAME

BACKGROUND OF THE INVENTION

The invention relates generally to multiplayer video games.

Conventional home video game devices generate an electrical television signal which drives a conventional television to display a game environment on the television's screen. The environment typically includes at least one object which can be controlled by a player of the game.

The device also includes a plurality of input ports, each connected to an input control device. Each player manipulates an input control device to direct the game device to move objects within the game environment.

One object of the invention is to provide a home video game controller which allows a local player to play a multiplayer game in his home against an opposing player who is located in a different home. Another object of the invention is to assure that the game environment displayed by a local video game controller is identical to a game environment displayed by a remote video game controller operated by the opposing player.

Another object of the invention is to provide a home video game controller which can be connected to a telephone transmission line to transmit a local player's image control commands to a remote location and to receive an opposing player's image control commands from the remote location. Another object is to allow the players to speak with each other over the telephone lines while playing the game.

SUMMARY OF THE INVENTION

The invention relates to a video game controller for allowing a local player to play a video game against a remote player who is located, for example, in a different home than the local player. The controller receives a plurality of image control commands from a local input device operated by the local player. The controller includes a modem which transmits the local image control commands to a remote game controller connected to a transmission line. The modem also receives from the remote game controller a plurality of remote image control commands. The video game controller then generates a sequence of game image frames in response to the local and remote image control commands.

In preferred embodiments, the video game controller includes a voice communication controller for allowing a local player to speak with a remote player while playing the game. The voice communication controller receives a local voice signal representing the local player's voice and transmits the local voice signal to a remote video game controller. It also receives a remote voice signal representing the remote player's voice. In response to the remote voice signal, a loudspeaker generates an acoustic replica of the remote player's voice.

In another aspect, the invention relates to a local video controller for generating a sequence of local image frames which is in synchronism with an identical sequence of remote image frames. The local video controller determines a current status F of the sequence of local image frames. It receives a local image control command $S_L(F)$ representative of a user's instruction for changing the current status F of the image frame sequence. It then transmits the local control command $S_L(F)$ to a remote video controller.

The local video controller receives from the remote video controller a remote image control command $S_r(F_r)$. It then generates in response to the local and remote image control commands, a new image frame.

In preferred embodiments, the video controller determines, for each remote image control command, a corresponding status $F_r$ of a sequence of remote image frames. In one such embodiment, the video controller receives the remote status $F_r$ from the remote device along with the corresponding remote image control command $S_r(F_r)$. To generate the new frame, the video controller selects a local control command $S_L(F)$ representative of a local user's instruction for changing the current status F of the sequence of local image frames. Similarly, it selects a remote control command $S_r(F_r)$ representative of a remote user's instruction for changing the corresponding status $F_r$ of the sequence of remote image frames, wherein the status F is essentially identical to the status $F_r$. It then prepares the new frame in accordance with the selected local and remote control commands.

In another embodiment, the video controller adjusts a frame rate at which the sequence of local image frames is generated. Toward this end, the video controller compares the current status F of the sequence of local image frames to the status $F_r$ of the sequence of remote image. If the comparison indicates that the sequence of local image frames substantially leads the sequence of remote image frames, the video controller reduces the frame rate. For example, one way of adjusting the frame rate is to adjust a horizontal blanking interval between each of a plurality of display lines of a frame. The video controller may also adjust a vertical blanking interval between each of a plurality of frames of the sequence of local image frames to change the overall frame rate.

Other objects, features and advantages of the invention are apparent from the following description of preferred embodiments taken together with the drawings.

BRIEF DESCRIPTION OF THE DRAWINGS

FIG. 1 is a block diagram of a remote controlled multiplayer video game system.

DESCRIPTION OF THE PREFERRED EMBODIMENT

Figure 2A:
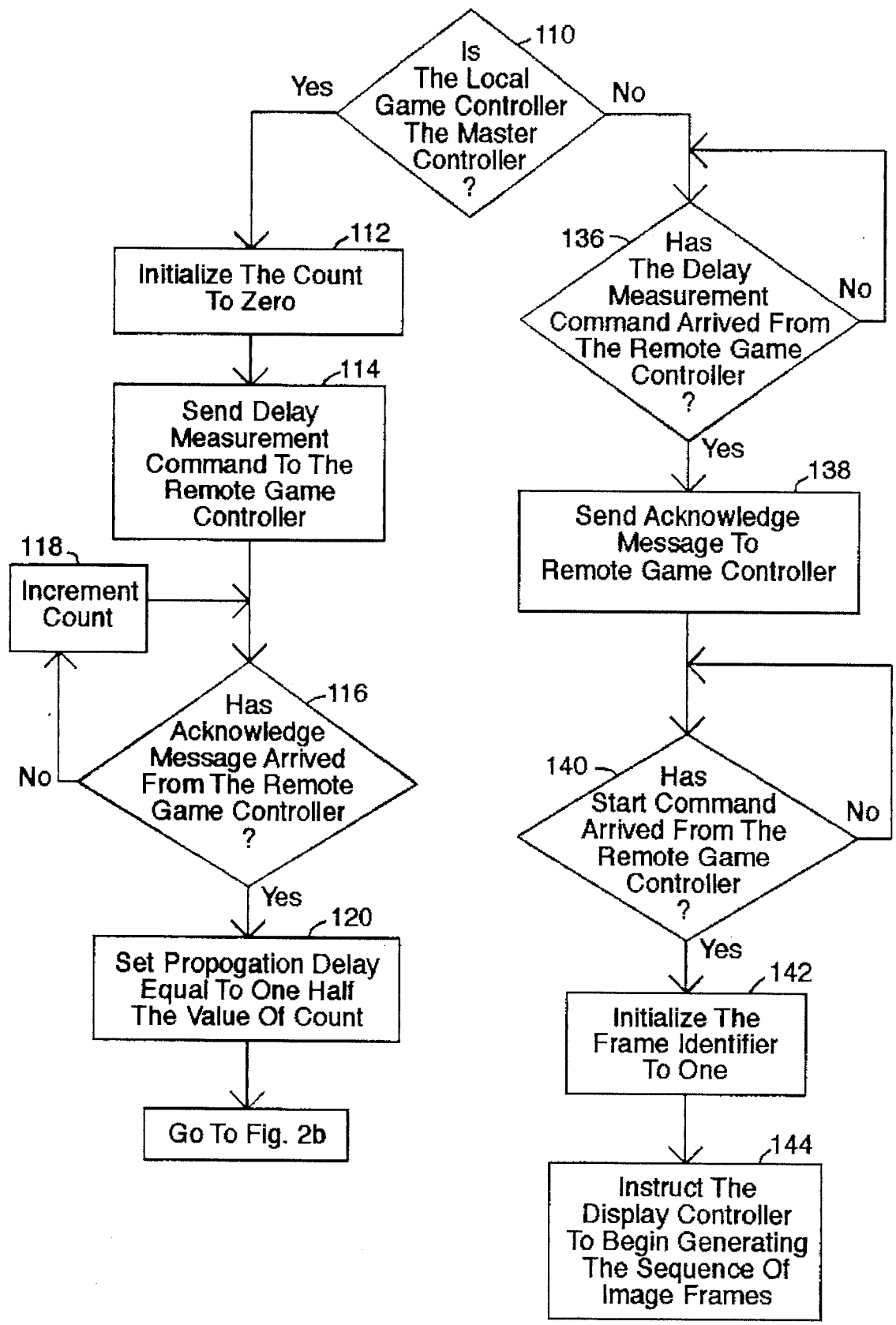
FIGS. 2(a) and 2(b) are a flow chart illustrating the operation of a game start procedure.

Referring to FIG. 1, a multiplayer video game system according to the present invention includes a local video game controller 10(a) connected to a remote video game controller 10(b) through a telephone switching network 34. A game cartridge 36(a) which defines the characteristics of the game is connected to the local game controller 10(a). Similarly, an identical game cartridge 36(b) is connected to the remote game controller 10(b). The game controllers read game instructions from their respective game cartridges and, in response, generate identical television signals representing a game environment. The television signals are each provided to television monitor 12(a), 12(b) to produce a video representation of the game environment.

The environment typically includes one or more objects which can be controlled by players of the game. Each game controller is connected to a pair of local input control devices 30, 32, such as well known joysticks, track balls, or input keys, which allow players to instruct the game controller to move the objects. In one mode of operation, the local game controller 10(a) allows two local players to play against each other. In this mode, each player manipulates a local input control device 30(a), 32(a) to direct the game controller to move objects within the game environment.

In another mode, the local game controller allows a local player to play against a remote player who is operating a remote game controller 10(b). The local game controller 10(a) includes a telephone input jack for connecting to a telephone 24(a). To establish a communication link between the local and remote game controllers, the local player dials on the telephone the telephone number of the remote player's home. The local game controller 10(a) forwards the telephone signal over the telephone line 38(a) to the telephone switching network 34. The switching network accordingly transmits a ring signal over telephone line 38(b) to the remote game controller 10(b).

The remote game controller forwards the incoming ring signal to a remote telephone 24(b) causing it to ring. The remote player then picks up the telephone receiver to establish the telephone connection.

To allow the players to communicate with each other while playing the game, telephone headsets 26(a), 26(b) are connected to the respective game controllers 10(a), 10(b). Each headset includes a pair of loudspeakers 40 which fit snugly to the player's head. The loudspeakers reproduce the opposing player's voice received over the telephone line. Each headset also includes a microphone 42 which hangs in front of the player's mouth. The microphone produces a microphone signal representative of the player's voice. The game controller forwards the microphone signal over the telephone line to the opposing player. Since the player does not need to hold the microphone, his hands are free to manipulate an input device to play the game. A speaker telephone may be used in lieu of the headset. In a preferred embodiment, the speaker telephone is included within the game controller 10(a).

To start playing the game, the local player enters a start instruction using a first local input device 30(a). As explained more fully below, a central processing unit (CPU) 28(a) reads a first input register 14(a) to receive the start signal from the input device 30(a). It then forwards the start signal to a modem 22(a) which transmits an analog modulation signal representative of the start signal over the phone line 38(a).

Remote game controller 24(b) includes a modem 22(b) which receives the analog modulation signal and reproduces therefrom the start signal. A CPU 28(b) within the remote game controller reads the start signal from the modem 22(b) and determines that the game is to begin.

Modems 22(a), 22(b) thus allow the game controllers to transmit both image control commands and microphone signals over the same phone line. The modems transmit the signals at alternate moments in time to share the phone line. However, as is well known to those skilled in the art, the limited bandwidth of the phone line limits the rate at which information can be transmitted. Accordingly, depending on the quality of the phone line and the rate at which the game controllers generate image control commands, the modems may not be able to transmit both voice and control signals over the same phone line. In such embodiments, separate phone lines are needed for the voice and game control signals. If required, three phone lines may be used, a first for transmitting the voice signals, a second for transmitting image control commands from the local game controller to the remote game controller, and a third for transmitting image control commands from the remote game controller to the local game controller. In such embodiments, the game controllers each include a telephone connection jack for each phone line and a dialing mechanism for dialing a telephone number to establish a separate telephone connection for each line.

Once a player enters the start command signal, each game controller begins generating a television signal to produce a sequence of image frames on the television. The game controllers 10(a), 10(b) must provide their respective televisions 12(a), 12(b) with essentially the same sequence of image frames. If the sequence of image frames differ, each player will enter image control commands in response to a different game environment. Thus, the local and remote game environments will tend to diverge over time as each player enters commands which lead to different results in each of the two environments.

PROCEDURE FOR SYNCHRONIZING THE START OF THE REMOTE AND LOCAL GAME CONTROLLERS

To assure synchronous operation of the game controllers, the CPUs 28(a), 28(b) implement control routines stored in their respective control memories 20(a), 20(b). Both memories 20 include a start routine which directs the game controllers to begin generating the game's sequence of image frames at approximately the same time. The start procedure is illustrated by the following description of the local CPU's implementation of the procedure.

Figure 2B:
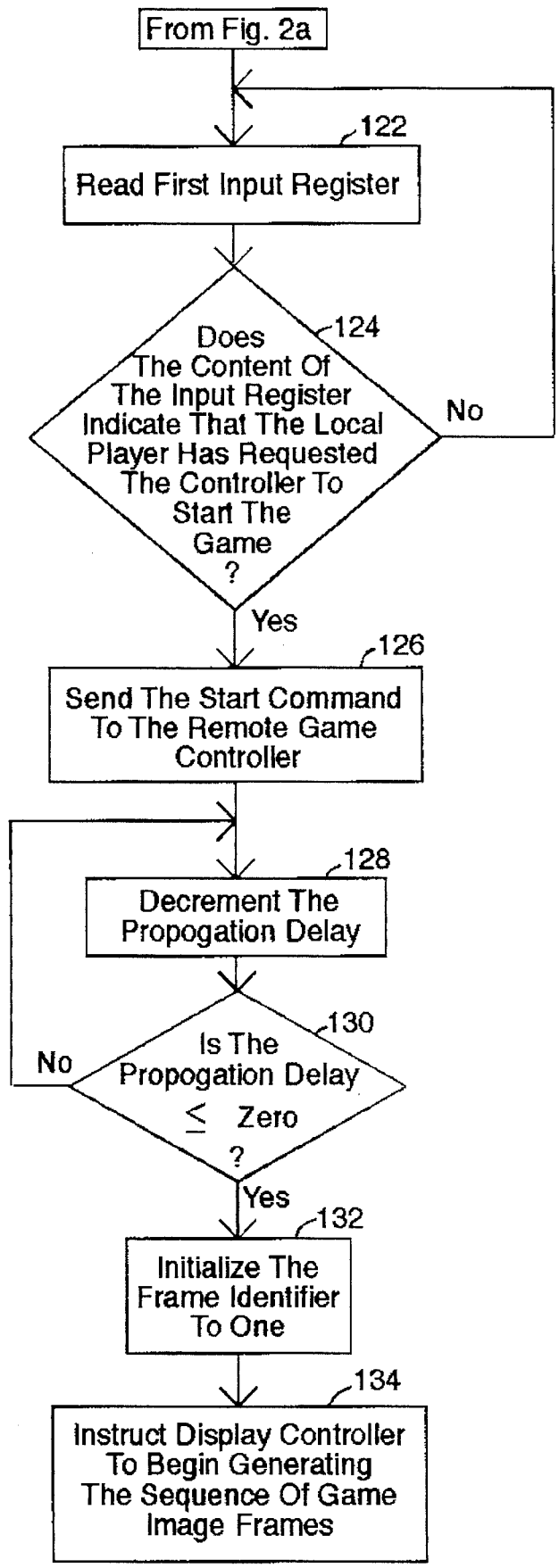

Referring to FIGS. 2(a) and 2(b), CPU 28(a) first determines whether the local game controller is a master game controller or a slave controller. (Step 110) If it is a master controller, it is responsible for controlling the start of the game. Only the player of the master controller can start the game.

Any technique may be used to select which of the game controllers is the master. It is critical, however, that both game controllers agree on the selection. In the preferred embodiment, the game controller which initiated the telephone call to establish the phone connection (or connections if a plurality of phone lines are used) is the master controller. The other game controller is the slave.

If the local game controller is the master, it measures the amount of time for an image control command to propagate from the local game controller to the remote game controller. Toward this end, it first initializes a Count register (within memory 20, FIG. 1) to zero. (Step 112). It then ;ends a Delay Measurement command to the remote game controller. (Step 114). Upon receipt of the Delay Measurement command, the remote game controller immediately returns an Acknowledge message. While waiting for the Acknowledge message, the local CPU 28(a) increments the Count register at regular intervals. (Step 116, 118). As soon as the Acknowledge message arrives, CPU 28(a) freezes the Count register at its current value. Accordingly, the content of the Count register represents an estimate of the round trip delay time. To estimate the propagation time in one direction, CPU 28(a) divides the count by two and stores the resultant propagation delay count in the Count register. ( Step 120).

After measuring the propagation delay time, CPU 28(a) begins polling the input register 14(a) (FIG. 1) to determine if the local player has requested the controller to start the game. (Steps 122, 124). Once CPU 28(a) reads a start command from the input register, it forwards the start command to the remote game controller (Step 126). It then immediately begins decrementing the propagation delay count stored in the Count register in the same regular intervals used to increment the count (Steps 128, 130). Once the propagation delay has been decremented to zero, CPU 28(a) initializes a frame identifier F (described more fully below) to one. (Steps 132). It then immediately instructs a local display controller 18(a) (FIG. 1) to begin generating the sequence of game image frames. (Step 134).

The delay introduced by decrementing the propagation delay approximates the time required for the start command to arrive at the remote game controller. Since the remote game controller begins generating the sequence of game image frames immediately upon receipt of the start command, both game controllers should begin at approximately the same time.

If, in implementing the start procedure, tile local CPU 28(a) determines that it is the slave, it waits for a delay measurement command from the remote game controller. (Step 136) As soon as it detects the measurement command, it returns an acknowledge message to the remote game controller. (Step 138) It then waits for the arrival of a start command from the remote controller. (Step 140) In response to the start command, it initializes the frame identifier F to one and instructs the display controller 18(a) to begin generating the sequence of game image, frames. (Steps 142, 144)

The start control routine thus directs the remote and local game controllers to begin al approximately the same time. However, additional control is required to assure that the controllers continue to generate an identical sequence of image frames.

SYNCHRONOUS GENERATION OF GAME IMAGE FRAMES

Toward this end, tile game controllers 10(a), 10(b) each include a synchronous display controller 18(a), 18(b) for generating a sequence of image frames in response to selected inputs. The operation of the display controllers 18(a), 18(b) is illustrated by the following description of the local display controller 18(a).

The first two frames of the sequence are completely defined by the game instructions stored ill the game cartridge. The display controller defines each subsequent frame solely on the basis of four parameters, namely:

1) the status of the previous frame, 2) the game instructions provided by the game cartridge, 3) an image control command from the local player, and 4) an image control command from the remote player.

Figure 3:
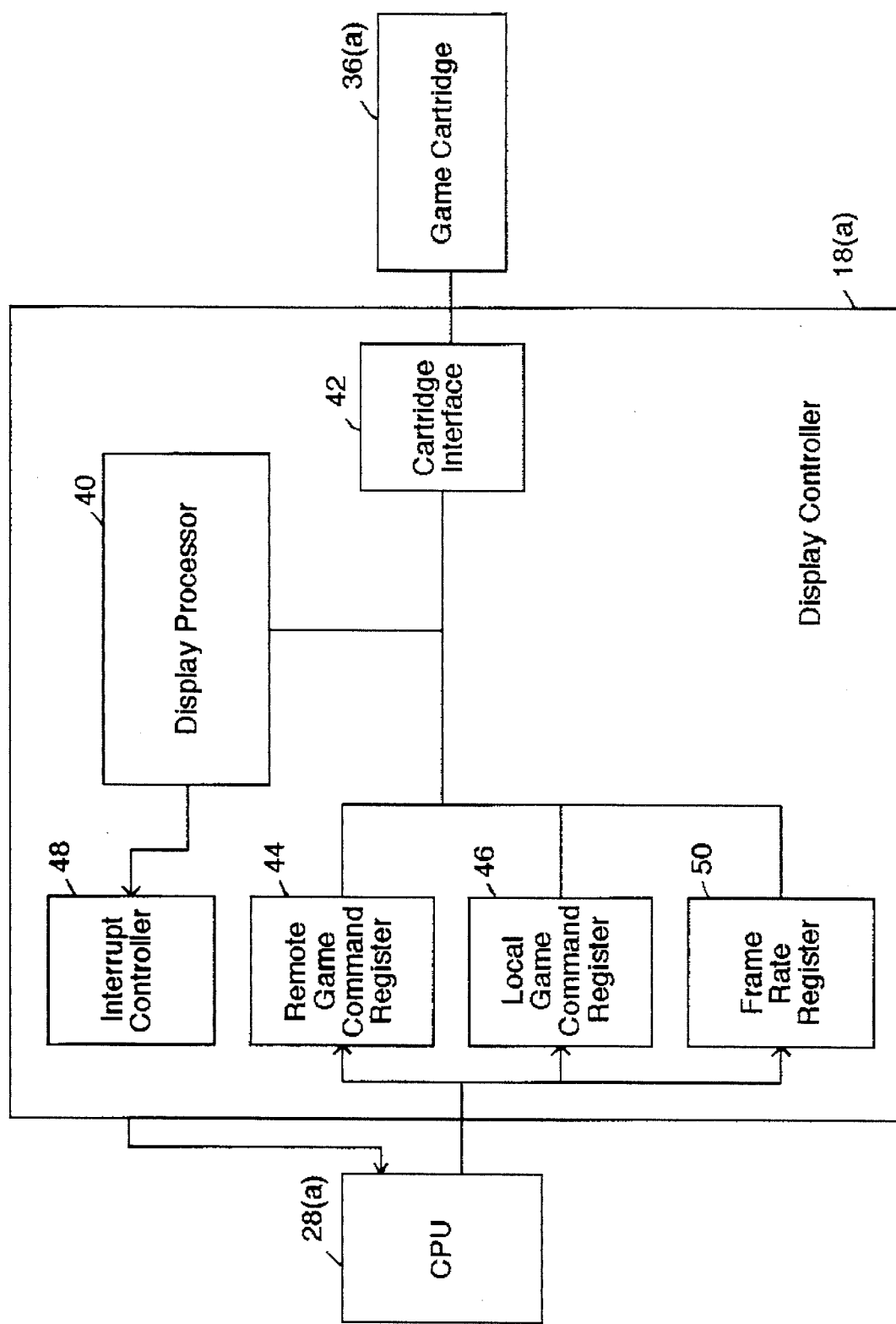
FIG. 3 is a block diagram of a synchronous display controller.

Referring to FIG. 3, the display controller includes a display processor 40 for fetching a set of parameters and generating an image frame based on the set of parameters. The display processor internally stores frame status data representative of the status of the most recently displayed frame. To obtain the game instructions for creating the next frame, the display processor directs a cartridge interface 42 to retrieve the instructions from the game cartridge 36(a). To obtain the image control commands, the display processor directs an interrupt controller 48 to interrupt CPU 28(a). As explained in more detail below, the CPU responds to the interrupt by loading a remote image command register 44 with the remote image control command and a local image control command register 46 with a local image control command.

SYNCHRONOUS SAMPLING OF THE INPUT DEVICES

Figure 4:
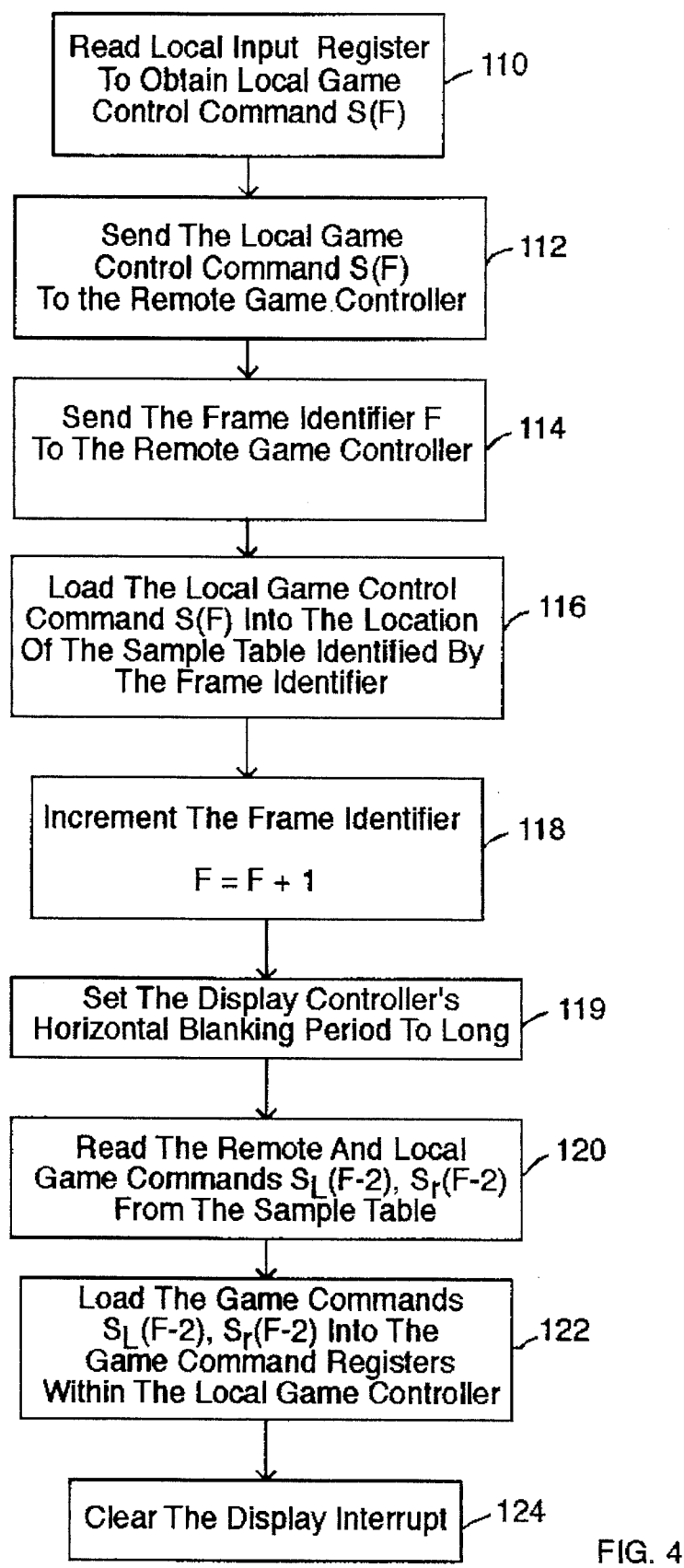
FIG. 4 is a flow chart illustrating a procedure for sampling the status of a game control input device and providing the samples to the display controller.

In response to the interrupt, CPU 28(a) first implements a procedure stored in memory 20 to sample the status of the local input device 30(a). Referring to FIG. 4, CPU 28(a) reads the contents of the local input register 1(a) to determine the status of the input device (referred to herein as the local player's image control command $S_L$) (Step 110). After reading the image control command $S_L$, the CPU transmits the command $S_L$ to the remote game controller. (Step 112). The CPU also transmits a frame identifier F which identifies the frame displayed on the television screen at the time the command was read from the register. (Step 114)

The CPU writes the command $S_L(F)$, to a location in a sample table (within local memory 22) which is allocated for storing the local image control command for the frame F (Step 116).

Figure 5:
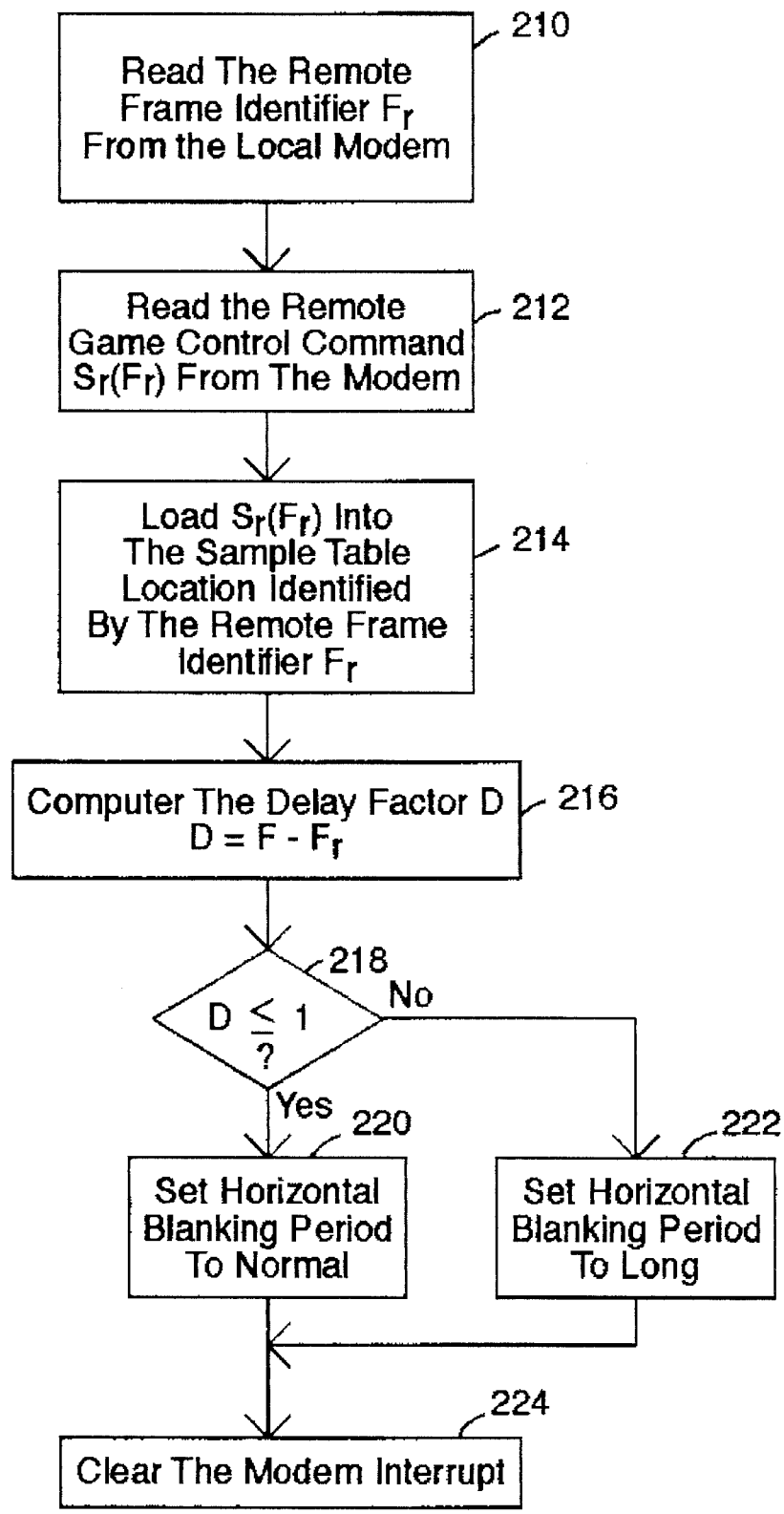
FIG. 5 is a flow chart illustrating a procedure for adjusting the display controller's output frame rate to synchronize the sequence of local image frames with the arrival of status samples of a remote game control input device.

The remote game controller samples the remote input device in the same manner and transmits the image control commands and the corresponding frame identifiers to the local game controller. Upon receipt of a remote image control command, the local modem 22(a) interrupts CPU 28(a). Referring to FIG. 5, in response to the modem interrupt, the CPU reads the remote image control command $S_r(F_r)$ and corresponding frame identifier $F_r$ from the modem. (Steps 210, 212). It then stores the image control command $S_r(F_r)$ in the sample table at a storage location allocated to the remote frame identifier $F_r$. (Step 214). As explained more fully below, the CPU then adjusts the rate at which the display processor generates frames (Steps 216–222), clears the modem interrupt, and returns to normal operation (Step 224).

Referring again to FIG. 4, after loading the sample table with the recently obtained local image control command, the CPU increments the frame identifier F to identify the next frame to be displayed. (Step 118). For reasons explained below, the CPU loads a frame rate register 50 (FIG. 3) in the display controller with a "Long " value. (Step 119). It then reads from the sample table a pair of image control commands $S_L(F-2)$, $S_r(F-2)$ which represent the player's respective image control commands at the time the previous frame F-2 was on display. (Step 120). It then loads the pair of image control commands in registers 44, 46 (FIG. 3) within the display controller for use in preparing the next frame F. (Step 122). (The CPU selects the image control commands from the previous frame F-2 rather than the commands from the most recent frame F-1 to allow time for the remote image control command to arrive over the telephone transmission line. As explained more fully below, if the remote command is delayed in arriving, the controller slows the rate at which frame F-1 is generated to allow additional time for the command to arrive.) Finally, after sending the image control commands to the display controller, the CPU clears the display interrupt to end the cycle. (Step 124).

Figure 6:
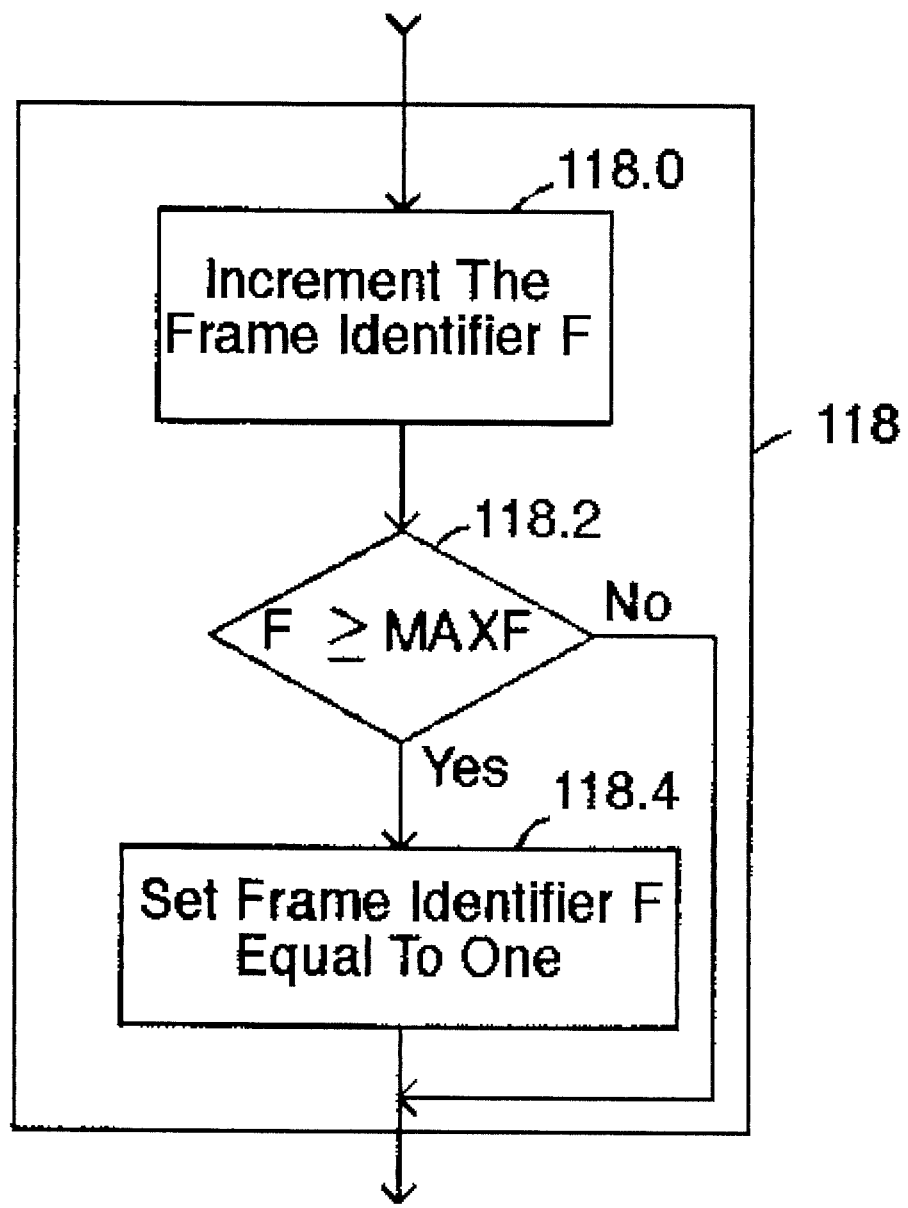
FIG. 6 is a flow chart of a procedure for updating a frame identifier.

An extremely large number of frames are generated during the operation of a game. If a unique frame identifier F is assigned to each frame, many bits are required to represent each frame identifier. Yet, these bits take time to transmit over the telephone transmission line. There is no need, however, to assign a unique frame identifier to all frames generated during the operation of the entire game. The game controller uses the frame identifier merely to identify which of several recent frames was on display at the time the command was accepted. Accordingly, referring to FIG. 6, the following describes Step 118 (FIG. 2(a)) in further detail. As explained above, CPU 28(a) increments the frame identifier to identify the next frame to be displayed. (Step 118.0). CPU 28(a) then compares the current frame identifier F to a maximum number MAXF (e.g., eight) (Step 118.2). If the frame identifier equals the maximum, the CPU initializes the frame identifier back to one. (Step 118.4). Thus, the command frame identifier cycles from one through eight. This is sufficient to distinguish recent commands from each other. Yet, since the frame identifier can be represented by only three bits, little time is required to transmit the frame identifier.

It should be noted that the frame identifier need not be transmitted. In an alternative embodiment, the local CPU 28(a) maintains a remote frame count which is initialized to zero at the start of the game. Upon the arrival of each remote image control command, the CPU increments the count. This embodiment requires that the modems 22(a), 22(b) transmit the image control commands in the exact sequence in which they were read from the input registers.

Figure 7:
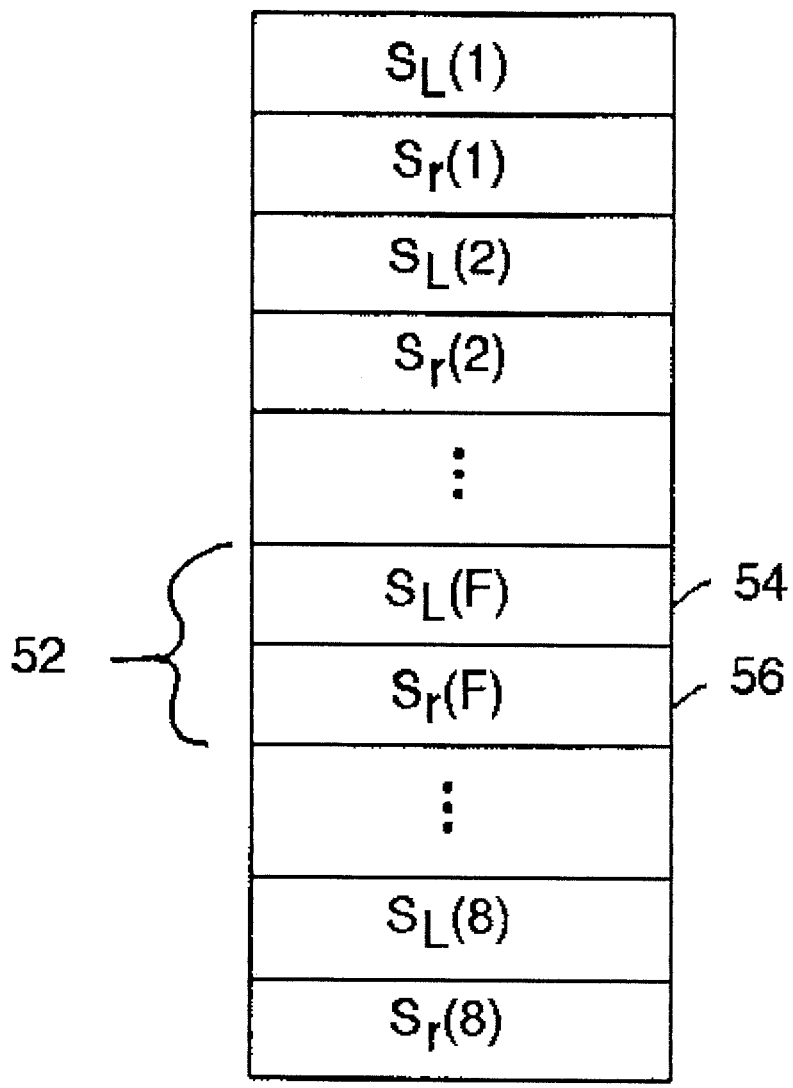
FIG. 7 is a diagram of a sample table for storing samples of the status of game control input devices.(i.e., image control commands).

Referring to FIG. 7, the organization of the image control command sample table is now discussed in further detail. The sample table includes a pair of storage locations 52 for each frame identifier F. In the embodiment shown, the sample table includes eight pairs of storage locations, one pair for each of the eight possible values of the frame identifier. The first location 54 in pair 52, for example, is allocated for storing the local image control command $S_L(F)$ for the corresponding frame F. The second location 56 is allocated for storing the remote image control command $S_r(F)$ for the same frame.

ADJUSTING THE FRAME RATE

The CPU must assure that the desired remote image control command has arrived from the remote game controller in sufficient time for the display controller to prepare the next frame. However, the time for the remote image control command to propagate from the remote game controller to the local game controller may vary. For example, the transmission of an image control command may be corrupted due to noise on the telephone line. If the local modem 22(a) (FIG. 2) is unable to decode the control command, the remote modem retransmits the control command. As explained above, the CPU allows for such delay by providing the display processor with the image control commands $S_L(F-2)$, $S_r(F-2)$ from the previous frame F-2 for use in constructing the new frame F. However, as explained more fully below, the CPU and display processor also adjust the rate at which the display processor generates frames to assure that the sequence of frames generated by local display processor does not excessively lead or lag the remote game controller's frame sequence.

Figure 8:
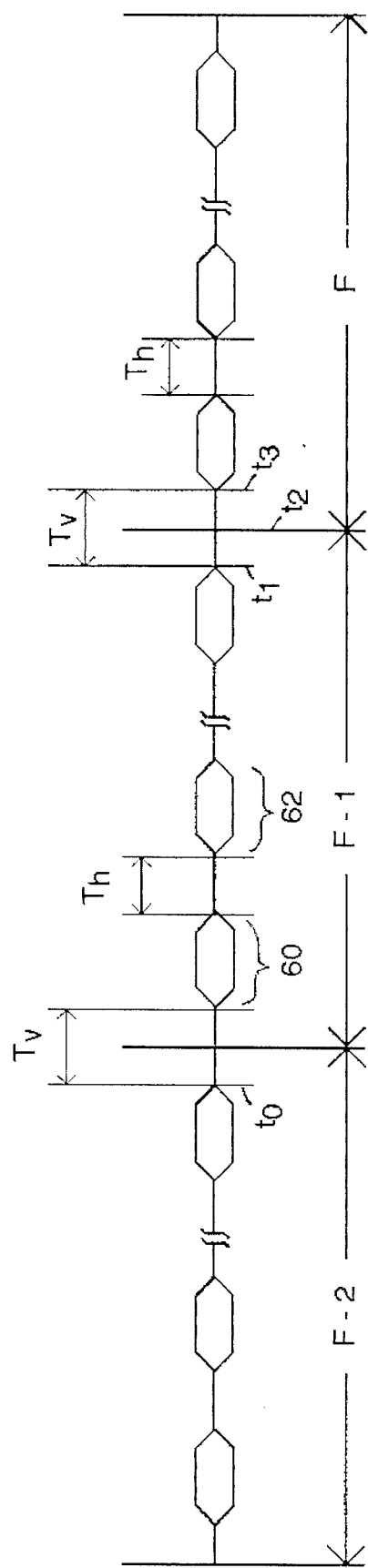
FIG. 8 is a timing diagram of a video output signal representing a sequence of image frames.

FIG. 8 is a timing diagram illustrating the timing of three frames F, F-1, and F-2 of the television signal. The television 12(a) (FIG. 1) is a raster display device. For a first horizontal line of the frame F-1, the display processor generates a line of picture elements ("pixels") 60. It then waits for a period of time Th, (referred to herein as the "horizontal blanking period"). The length of the horizontal blanking period is determined by the content of frame rate register 50 (FIG. 3). To slow the rate at which the display processor generates frames, the CPU loads the frame rate register 50 with a large value to increase the horizontal blanking period. Similarly, to increase the frame rate, it loads the register with a small value.

After the horizontal blanking period, the display processor begins generating the next line of pixels 62. The same process is repeated for each line of the frame. After displaying the last line of the frame, (time $t_1$), the display processor instructs interrupt controller 48 (FIG. 3) to interrupt the CPU. As explained above, the CPU reads the local image control command $S_L(F-1)$ from the input register 14(a) for the recently generated frame F-1, and loads the next set of image control commands $S_L(F-2)$, $S_r(F-2)$ into the registers 44, 46 for use in constructing the frame F (See FIGS. 1,3).

After the image control commands arrive in the registers 44, 46, (at time $t_2$), the display processor begins constructing the first line of pixels for the next frame, F. At time $t_3$, the processor begins displaying the first line of the new frame F. The time between the end of the last line of frame F-1 (time $t_1$) and the beginning of the first line of frame F (time $t_3$) is referred to herein as the vertical blanking period $T_v$.

As explained below, the CPU adjusts both the horizontal and vertical blanking periods to synchronize the display processor to the arrival of remote image control commands.

Referring again to FIGS. 4 and 5, the following describes a procedure for adjusting the local display processor's frame rate to synchronize the sequence of display frames to the arrival of the remote image control commands. As explained above, the CPU loads the frame rate register 50 with a "Long" value immediately after incrementing the frame identifier to begin a new frame F. Accordingly, the frame rate is at this point in time set to a slow rate. However, after receiving a remote image control command and its corresponding remote frame identifier $F_r$, (Steps 210–214) the CPU computes a delay factor D representing the number of frames by which the local frame identifier F leads the recently arrived remote frame identifier $F_r$. (Step 216). If the delay factor is less than or equal to one, the CPU concludes that the remote and local display controllers are in synchronism. (Step 218). Accordingly, it loads the horizontal blanking register with a normal value to increase the frame rate to its normal rate. (Step 220). If D is greater than one, the CPU concludes that the remote controller was delayed in transmitting the remote image control command. Accordingly, it does not change the local frame rate from the slow rate previously set at the beginning of the frame F. (Steps 218, 222). Thus, until the remote image control command for the frame F-1 arrives, the display controller generates the frame F at a slow rate. However, as soon as the command $S_r(F-1)$ arrives, the frame rate is immediately increased to the normal rate.

Figure 9:
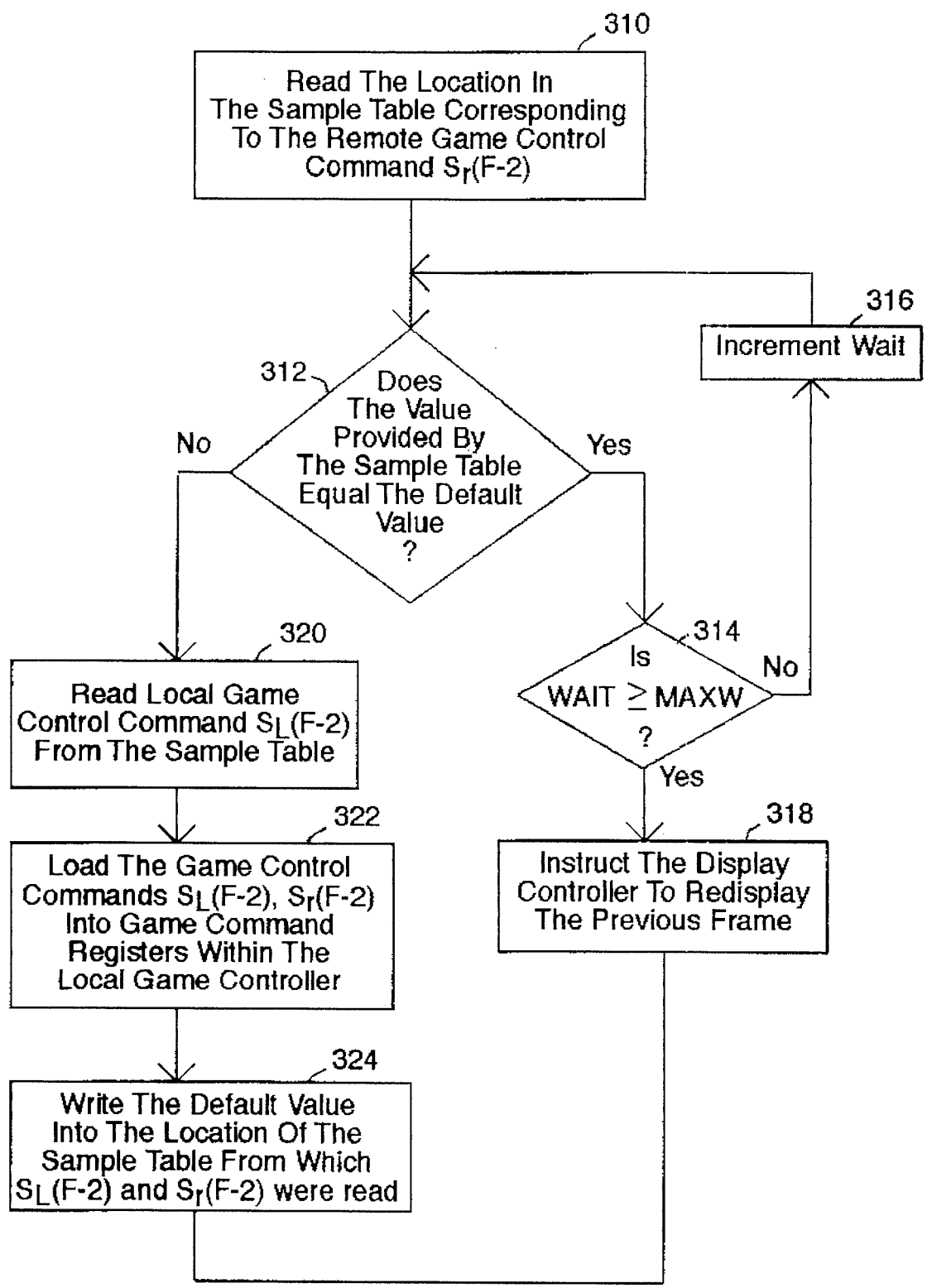
FIG. 9 is a flow chart illustrating in further detail a procedure for providing samples from the sample table to the display device and for adjusting the frame rate if desired samples of the status of a remote game control device are not yet available.

Referring to FIG. 9, the following describes in further detail Steps 120 and 122 (FIG. 4) for retrieving image control commands from the sample table and forwarding them to the display controller. The CPU first reads the sample table entry corresponding to the remote image control command $S_r(F\text{-}2)$. (Step 310). Referring to FIG. 3, this command was accepted by the remote game controller at a time $t_0$ soon after frame F-2 was displayed on the remote television 12(*b*). Accordingly, it should have arrived at the local game controller by the time local frame F begins since an entire frame F-1 separates the sampling of $S_r(F\text{-}2)$ from the start of frame F. To determine whether the requested control command has arrived in the sample table, the CPU compares tile content of location of the sample table to a default value (Step 312). Each entry of the sample table is initialized by, the CPU prior to starting the game with a default value. Thus if the sample table contains the default value at the corresponding location, the CPU concludes that the control command has not yet arrived. Accordingly, it pauses briefly, for example by incrementing a "Wait" register count (initialized to zero at startup), and again reads the sample table to determine if the remote sample has arrived. (Steps 312, 314, 316). However, the CPU can only wait for a limited time before the television screen will noticeably decay without the stimulus of a new frame. Accordingly, if the remote command does not arrive in time (i.e., Wait exceeds a maximum value MAXW), the CPU sends the display controller a command instructing it to redisplay the exact same frame as previously displayed. (Steps 314, 318).

After displaying the same frame to provide time for the remote command to arrive, the display controller again interrupts the CPU to request the sample commands for use in generating the next frame. However, this time the CPU does not take a new sample of the inputs. Rather, it skips Steps 110–118 (FIG. 4) and again reads the sample table entry corresponding to the remote command $S_r(F\text{-}2)$. In effect, the redisplayed frame is treated as if it never occurred.

If the remote command is available, the CPU reads the corresponding local image control command $S_L(F\text{-}2)$. (Step 320). It then provides provides both the local and remote commands $S_L(F\text{-}2)$, $S_r(F\text{-}2)$ to the display controller for use in generating the frame F. (Step 322). The CPU then writes the default value into the locations of the sample table from which the commands $S_L(F\text{-}2)$, $S_r(F\text{-}2)$ were read to indicate that the remote and local image control commands for the next cycle of the frame identifiers have not yet arrived.

Thus, the video game controllers include mechanisms for synchronizing a local video image frame sequence to a remote image frame sequence. Toward this end, they adjust the frame rate of either image frame sequence to accommodate variations in the propagation time required for image control commands to propagate from one controller to the other.

While the invention has been described in conjunction with preferred embodiments, it is evident that numerous alternatives, modifications, variations and uses are apparent to those skilled in the art in light of the foregoing description. For example, the invention has been described in connection with a system having two video game controllers. It is apparent to those skilled in the art that additional video game controllers can be connected together in a similar manner.

What is claimed is:

1. A video game controller comprising:

a local input means for receiving a plurality of local image control commands from a local input device, means for transmitting said plurality of local image control commands to a remote game controller, means for receiving from said remote game controller a plurality of remote image control commands, display controller for generating in response to said plurality of local and remote image control commands, a local sequence of game image frames, a voice communication controller for transmitting a speech signal representative of a local player's voice to allow the local player to speak with a remote player without suspending operation of the video game, and synchronization means comprising:

means for determining, for each local image control command $S_L$, the local status $F_L$ of said local sequence of game image frames at the time said local input means received said local image control command, means for determining, for each remote image control command $S_r$, the remote status $F_r$ of a remote sequence of game image frames at the time said remote game controller received said remote image control command, and means for providing said display controller with a local image control command $S_L(F_L)$ received during local status $F_L$, and a corresponding remote image control command $S_r(F_r)$, received during remote status $F_r$, for use in preparing a new frame of said sequence, wherein said local status $F_L$ corresponds to said remote status $F_r$.

2. The video game controller of claim 1 wherein said voice communication controller comprises means for receiving a local voice signal representing the local player's voice, means for transmitting said local voice signal to a remote video game controller to allow the local player to speak to said remote player without suspeding operation of the game, means for receiving a remote voice signal representing the remote player's voice, and loudspeaker for generating an acoustic replica of the remote player's voice in response to said remote voice signal to allow the local player to listen to said remote player without suspeding operation of the game.

3. The video game controller of claim 1 further comprising a connection means for connecting to a plurality of telephone lines for transmitting said plurality of local image control commands to said remote game controller, for receiving from said remote game controller said plurality of remote image control commands, and for transmitting a speech signal.

4. The video game controller of claim 1 further comprising a means for connecting to a first telephone line for transmitting said local image control commands and for receiving said remote image control commands, and wherein said voice communication controller is connected to a second telephone line for transmitting a speech signal representative of the local player's voice to allow the local player to speak with the remote player without suspending operation of the video game.

5. The video game controller of claim 1 wherein:

said means for transmitting comprises a first connection means for connecting to a first telephone line for transmitting said plurality of local image control commands to said remote game controller, and said means for receiving comprises a second connection means for connection to a second telephone line for receiving from said remote game controller said plurality of remote image control commands; and said voice communication controller is connected to a third telephone line for transmitting a speech signal representative of the local player's voice to allow the local player to speak with the remote player without suspending operation of the video game.

6. The video game controller of claim 1 wherein said modem is connected to said voice communication controller and wherein said modem comprises a multiplexer for sending both said speech signal and said local image control commands over said at least one telephone line to allow the local player to speak with the remote player without suspending operation of the video game.

7. The video image controller of claim 1 wherein said means for transmitting said local image control commands comprises means for transmitting, for each local image control command, said corresponding local status $F_L$ and wherein said means for determining the remote status $F_r$ comprises means for receiving said remote status $F_r$ from said remote game controller.

8. A video game controller comprising:
   a local input means for receiving a plurality of image control commands from a local input device,
   a modem for connection to at least one telephone transmission line for transmitting said plurality of local image control commands to a remote game controller and for receiving from said remote game controller a plurality of remote image control commands,
   display controller for generating in response to said plurality of local and remote image control commands, a sequence of local image frames
   means for comparing a current status of said sequence of local image frames to a status of a sequence of remote image frames, and
   means for adjusting a frame rate of said sequence of local image frames if said comparison indicates that said sequence of local image frames substantially leads or lags said sequence of remote image frames.

9. The video image controller of claim 8 wherein said means for adjusting said frame rate comprises means for adjusting a horizontal blanking interval between each of a plurality of display lines comprising a frame.

10. The video image controller of claim 8 wherein said means for adjusting said frame rate comprises means for adjusting a vertical blanking interval between each of a plurality of frames of said sequence of local image frames.

11. A method for generating a sequence of local image frames, comprising the steps of:
   receiving a plurality of local image control commands from a local input device,
   transmitting said plurality of local image control commands to a remote game controller
   receiving from said remote game controller a plurality of remote image control commands,
   display controller for generating in response to said plurality of local and remote image control commands, a sequence of local image frames
   comparing a current status F of said sequence of local image frames to a status $F_r$ of a sequence of remote image frames, and
   adjusting a frame rate of said sequence of local image frames if said comparison indicates that said sequence of local image frames substantially leads or lags said sequence of remote image frames.

12. The method of claim 11 wherein adjusting said frame rate comprises:
   comparing said current status F of said sequence of local image frames to said status $F_r$ of said sequence of remote image, and
   reducing said frame rate if said comparison indicates that said sequence of local image frames substantially leads said sequence of remote image.

13. The method of claim 11 wherein adjusting said frame rate comprises the step of adjusting a horizontal blanking interval between each of a plurality of display lines comprising a frame.

14. The method of claim 11 wherein adjusting said frame rate comprises the step of adjusting a vertical blanking interval between each of a plurality of frames of said sequence of local image frames.

* * * * *